United States Patent [19]

Slight

[11] 4,403,551
[45] Sep. 13, 1983

[54] PNEUMATICALLY PROPELLED DUCT MOTOR

[75] Inventor: John R. Slight, Bromley, England

[73] Assignee: Post Office, London, England

[21] Appl. No.: 179,777

[22] Filed: Aug. 20, 1980

[51] Int. Cl.³ .................. B61B 13/10; F01B 15/02; F01B 19/04

[52] U.S. Cl. .................. 104/138 G; 91/217; 92/90

[58] Field of Search .......... 91/216 R, 217, 167 R; 92/15, 48, 89, 90, 91, 92; 104/138 G

[56] References Cited

U.S. PATENT DOCUMENTS 2,518,330 8/1950 Jasper et al. ............... 104/138 G
2,806,534 9/1957 Potts ............................. 92/90 X
3,263,573 8/1966 Fogelström et al. ......... 92/15 X

FOREIGN PATENT DOCUMENTS

1044201 9/1966 United Kingdom ............ 104/138 G

Primary Examiner—Robert B. Reeves
Assistant Examiner—H. Beltran
Attorney, Agent, or Firm—Kemon & Estabrook

[57] ABSTRACT

A duct motor for carrying drawing ropes and the like through cable ducts consists of two inflatable gripper bags and a telescopic section. The duct motor is driven by compressed air, and operates by one gripper bag inflating, telescopic section extending, the other gripper bag inflating and the one gripper bag deflating, telescopic section contracting and the cycle being repeated. Compressed air is distributed within the duct motor by a distribution valve and a pair of inflation and deflation valves associated with each gripper bag. One distribution valve is not located between the gripper bags and this valve has a valve stem which is hollow, and is used for conveying compressed air from an input orifice to the remote end of the duct motor i.e. the other gripper bag.

4 Claims, 7 Drawing Figures

PNEUMATICALLY PROPELLED DUCT MOTOR

BACKGROUND OF THE INVENTION

When cables, e.g. telephone cables are installed in ducts, there is a need to feed a rope or wire through the duct, in advance of the cable. The rope, after being threaded through the duct is attached to the cable, which is then pulled through the duct by pulling on the rope.

The duct motor of certain prior art devices suffers from the disadvantage that under high pneumatic pressures, the motor tends to "lock up" i.e. jam and refuse to work. The reason for this, is not fully understood. In addition this duct motor is long, uses a large number of components, and does not make the most efficient use of the pneumatic pressure available to drive it. The prior art duct motor, in essence consists of two inflatable bags disposed at each end of a telescopic member. The motor progresses along a duct by inflating one bag so that it grips the duct wall expanding the telescopic member, inflating the second bag so that it grips the duct wall contracting the telescopic member and so on. The cycle of events is controlled by means of a number of valves, in particular a main distribution valve, and inflation and deflation valves associated with the two gripper bags. High pressure air is delivered to one end of the duct motor, and thence passes to the appropriate gripper bag.

In the prior art duct motor, the central telescopic unit interconnecting the two bag grips (gripper bags) is a complex construction because of the need to provide an annular air space on the outside of the cylinder together with protective shields, to feed compressed air to the gripper bag remote from the compressed air supply. This means that the piston area inside the telescopic section does not approach the optimum value for most efficient use of the available pneumatic pressure, in relation to the overall diameter of the telescopic section. In addition in the prior art duct motor, the compressed air distribution valve is located between the two gripper bags, this means that the ratio of the unextended telescopic section to the extended telescopic section is substantially less than 2 to 1 i.e. the rate of advance is limited by the dead space between the gripper bags occupied by the distribution valve.

SUMMARY OF THE INVENTION

The present invention relates to a pneumatically propelled duct motor for pulling a cable draw rope or the like through a duct. It can be thought of as a pneumatically powered pig and can be used in pipes or the like, in addition to cable ducts. The duct motor of the present invention is not subject to "lock-up" at high pressure, and makes efficient use of the available pneumatic pressure and thus is of a simpler construction. In the present invention, the duct motor is configured to overcome various problems of prior art devices by feeding the compressed air along a hollow valve stem associated with the compressed air distribution valve. The distribution valve is not located between the gripper bags, thus enhancing the efficiency of operation of the duct motor. Furthermore, this feature has the advantage that the valves controlling inflation of the gripper bag closest to the distribution valve is not continually under high pressure.

According to a first aspect of the present invention there is provided a duct motor having first and second inflatable gripper bags separated by a telescopic member comprising a piston and cylinder arranged to move in directions to extend or contract said telescopic member when actuated by compressed air, an inflation valve and deflation valve associated with both said first and second inflatable gripper bags, and a distribution valve for controlling the direction in which said piston and cylinder move, said assembly arranged so that in operation, when compressed air is fed to said device through a compressed air input port, said duct motor passes through the following series of states in a cyclic manner when located within a duct:

A. Said telescopic member fully extended, said first and second inflatable gripper bags inflated;
B. Telescopic member contracting, said first gripper bag deflated, said second gripper bag inflated;
C. Telescopic member fully contracted, said first and second inflatable gripper bags inflated; and
D. Telescopic member extending, said first gripper bag inflated, said second gripper bag deflated;

said duct motor characterised in that said distribution valve has a hollow valve stem associated therewith, and said piston comprises a piston head connecting to a hollow piston rod, said hollow valve stem extending through said piston head into said hollow piston rod, whereby compressed air may be fed to said second inflatable gripper bag remote from said input port, via said hollow valve stem and said hollow piston rod.

Preferably said distribution valve seals are "O" ring seals.

Preferably said telescopic member interconnecting said two gripper bags is resistent to bending transverse to a common axis of said two bags, so that said two bags are always located substantially on said common axis.

Preferably said distribution valve is located co-axially with, and on a side of, said first gripper bag, remote from said telescopic member.

Preferably each pair of exhaust valve and inflations valves, operate by means of a single return spring.

An embodiment of the invention will now be described by way of example with reference to the accompanying drawings in which.

DESCRIPTION OF THE PREFERRED EMBODIMENT

The duct motor of the present invention will now be described with reference to the drawings. The duct motor consists essentially of three components, two inflatable grip bags 1 and 2, and a telescopic member 3 interconnecting the grip bags. The telescopic member consists of a cylinder having wall 4 and a piston having a piston head 5 and a piston rod 6. In operation the duct motor is inserted into a hollow cable duct, and has a compressed air line and a rope or wire attached to one end. The motor propels itself along the duct by a series of actions set out below, which are performed cyclically:

A. Grip bag 2 is inflated with compressed air, so that it grips the wall of the duct, and after this grip the bag 2 is deflated.
B. With grip bag 2 inflated and grip bag 1 deflated, the telescopic member 3 is contracted so that grip bag 1 is pulled along the duct towards the grip bag 2.
C. Grip bag 1 is then inflated so that it grips the wall of the duct, and after this grip bag 2 is deflated.
D. With grip bag 1 inflated and grip bag 2 deflated, telescopic member 3 is extended so that grip bag 2 is pushed along the duct away from grip bag 1.

The cycle then continues with step A. It is important to note that in steps A and C, both grip bags engage the duct walls simultaneously for a short period. The device operates as has already been implied on compressed air.

Control of the operation of the device is by means of five separate valves. Valve 7 is a main distribution valve for compressed air, valve 8 controls the inflation of bag 1, valve 9 controls the exhaustion of bag 1, valve 10 controls the inflation of bag 2, and valve 11 controls the exhaustion of bag 2.

Figure 2:
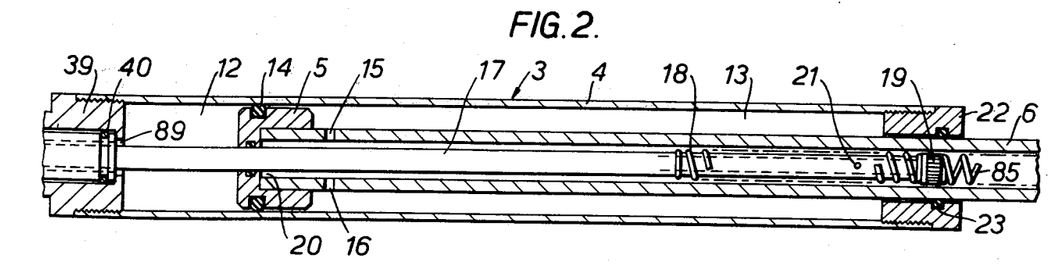
FIG. 2 shows a section through a middle portion of the duct motor according to the present invention.

The telescopic portion 3 of the duct motor illustrated in FIG. 2, consists of a piston 5 moving in a cylinder 4, so that spaces 12 and 13 exist on either side of the piston head 5. Expansion and contraction of the telescopic member is controlled by supplying compressed air to space 12, and 13 respectively. The seal between the piston head 5 and the cylinder wall 4 is by means of an "O" ring 14. The piston head 5 is mounted on cylindrical tube 6 which forms a piston rod; this tube has two orifices 15 and 16 connecting space 13 to the interior of the piston rod 6. Passing down the centre of piston rod 6 is a valve stem 17, associated with the distribution valve 7. The piston head 5 is free to slide relative to the valve stem 17. A spring 18 is located round valve stem 17 and bears on stop 19 at one end of the valve stem and on the interior surface of the piston head 5 at 20. The valve stem 17 is itself a hollow tube and the interior of valve stem 17 communicates with the interior of piston rod 6 by means of an orifice 21. The piston rod 6 passes from the cylinder 3 via an end seal block 22 which seals to the tube 6 by means of "O" ring 23.

Figure 1:
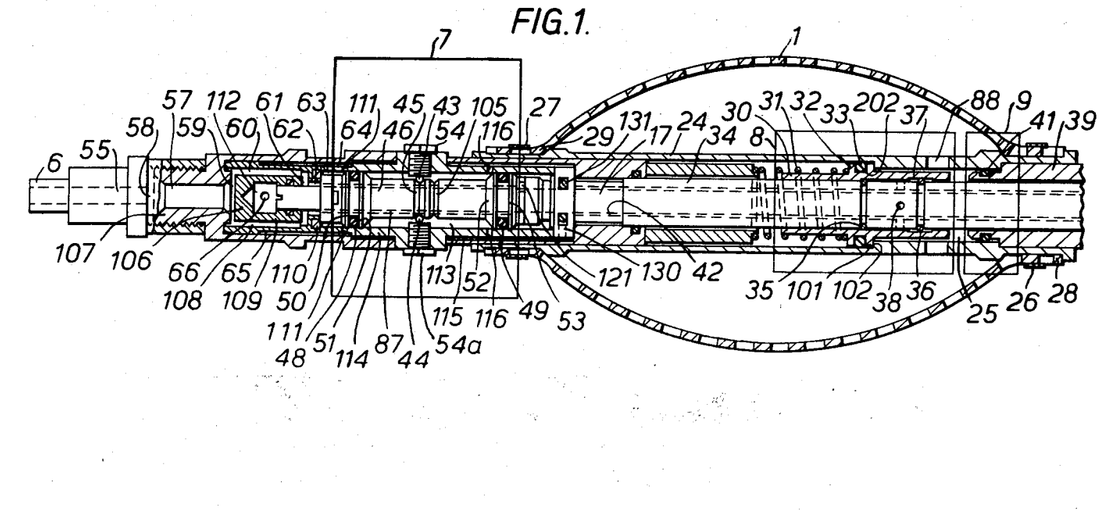
FIG. 1 shows a section through a first end portion of a duct motor according to the invention.

Turning now to FIG. 1 which illustrates gripper bag 1. The gripper bag 1 is made of a resilient material which does not exhibit strong stretching qualities, yet is completely flexible. The gripper bag is attached to an outer tube 24. The orifice 88 communicates between the air bag 1 and the interior 25 of tube 24. The bag 1 is attached to tube 24 by means of strappings 26 and 27, which constrict the bag into grooves 28 and 29 in tube 24.

Within tube 24 are located two valves 8 and 9. Valve 8 controls passage of compressed air into bag 1, i.e. controls over-inflation of bag 1. It consists of a valve member 30 biased to the right by a spring 31 bearing on flange 32. A raised circumferential ring 101 on valve member 30 engages with circumferential step 102 on tube 24 so that spring 31 biases the valve member 30 into engagement with step 102. An "O" ring 33 is retained within the valve member by a groove, and bears on the inner wall of tube 24. An inner tube 34 passes through valve member 30 and has two "O" rings 35 and 36 located in the grooves. "O" ring 36 is located in groove 37 cut in the inner wall of valve member 30 and can seal at either end of groove 37, but permits the passage of gas round it when it is located centrally of the groove. An orifice 38 is cut in the wall of tube 34 and is located between the two "O" rings 35 and 36.

The exhaust valve 9 for bag 1 comprises a body 39 which also acts as an end stop to cylinder 3. Inner tube 34 runs through the interior bore of 39 and an "O" ring 40 engages with an inner surface of member 39. An "O" ring 41 is located in a groove on the outer surface of member 39, and engages the inner surface of tube 24. The valve stem 17 passes through tube 34 and is a loose fit within it, so that compressed air can pass between the gap between tube 34 and valve stem 17. Orifice 38 communicates with this bag via the inflation valve 8 and the orifice 88.

The flow of air through the various passages of the duct motor is controlled by means of distribution valve 7, which has two stable conditions determined by ball bearings 43 and 44 acting in grooves 45 formed in valve stem 46. The valve stem seals against the inner wall of a tube 47 by "O" rings 48 and 49 held in place by flanges 50 to 53. Balls 43 and 44 are retained in position by screws 54 and 54a. An air passage 55 extends from the compressed air input 56 into cavity 57. A filter 58 is located at the input cavity 57. Cavity 57 communicates by means of air vents 59, 60, 61, 62 with cavity 63. Hole 111 communicates with a passage 64 which in turn communicates with hole 66 leading through to the central axis of the valve stem 17.

Figure 3:
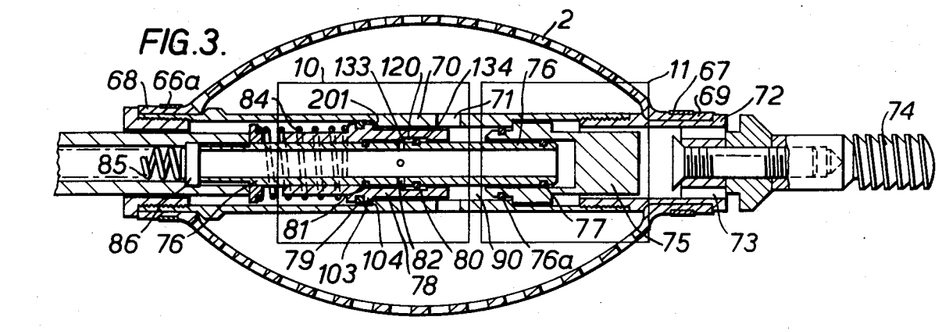
FIG. 3 shows a section through a second end portion of a duct motor according to the present invention.
Figure 4:
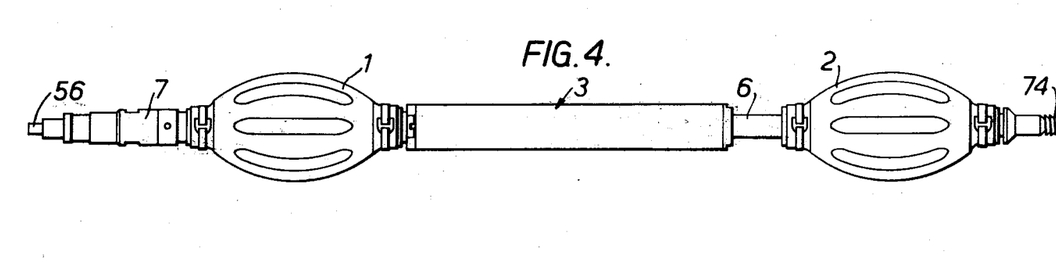
FIG. 4 shows a side view of an assembled duct motor according to the presention invention.
Figure 5:
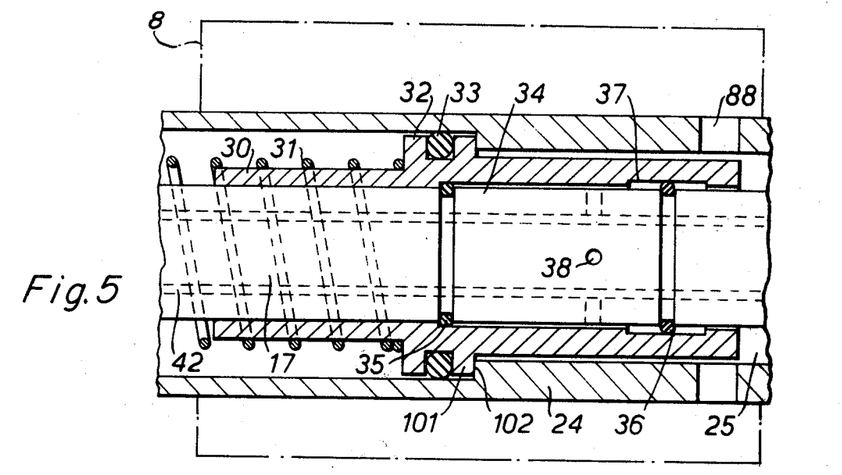
FIG. 5 shows an enlarged detail of an inflation valve of the duct motor as illustrated in FIG. 1.
Figure 6:
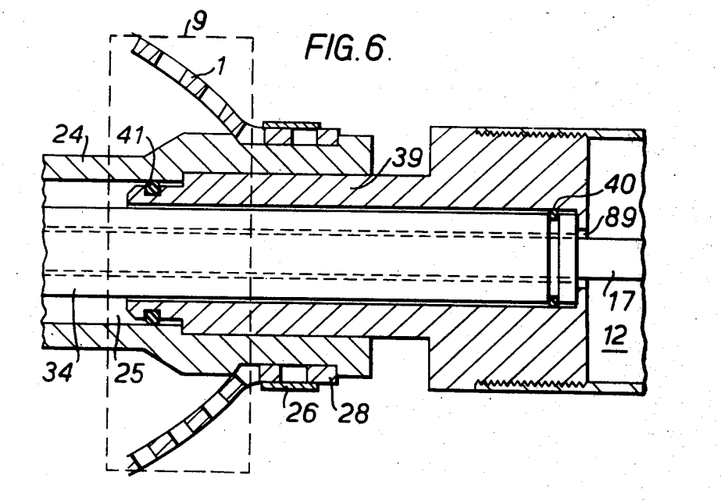
FIG. 6 shows an enlarged portion of an exhaustion valve of the duct motor as shown in FIG. 1.
Figure 7:
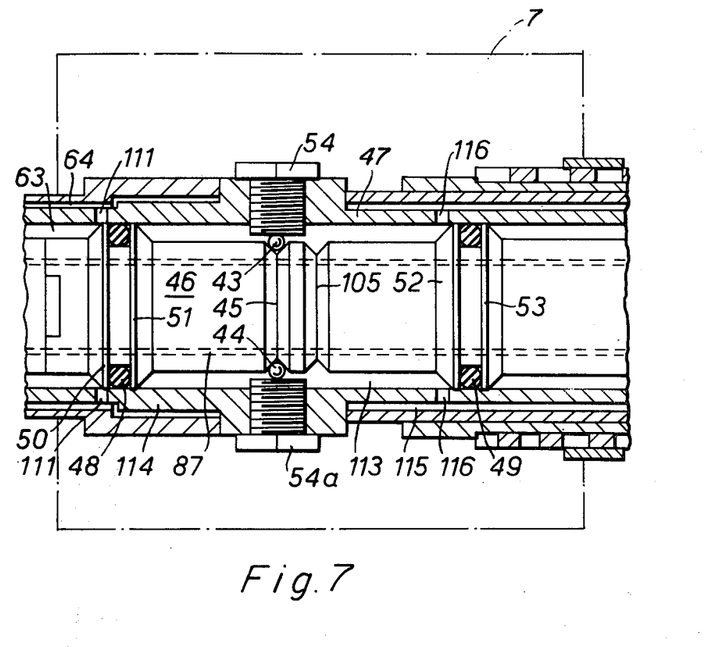
FIG. 7 shows an enlarged portion of the distribution valve of the duct motor as shown in FIG. 1.

Turning now to FIG. 3 and the second end of the duct motor. Valve 10 controls the inflation of bag 2, and valve 11 controls the deflation of the bag. The gripper bag 2 which is of similar construction to bag 1 is retained by strapping elements 66a and 67 on grooves 68 and 69 in a hollow tube member 70. An orifice 71 communicates between the interior of bag 2 and the interior of tube 70. Tube 70 is sealed at one end by a plug 72 having exhaust orifices 73 formed therein and communicating with the interior of tube 70. A screw threaded male member 74 is located at the extreme end of the duct motor, and can be used to connect the duct motor to a length of rod or a second duct motor having a female connector with sprung jaws.

Valve 11 consists of a member 75 sealed to tube 70 by means of "O" rings 76a in grooves formed on the outer wall of member 75. Member 75 is attached to tube 76 by means of a grub screw, not shown. A seal exists between tube 76 and member 75 provided by "O" ring 77.

The inflation valve 10 consists of a member 78 sealed against the interior wall of tube 70 by means of "O" ring 79. The tube 76 is sealed to the interior surface of valve member 78 by means of "O" rings 80 and 81. An orifice 82 in tube 76 communicates with a gap between the exterior wall of tube 76 and valve member 78. Valve member 78 is biased by spring 84 towards the right. A circumferential step 104 formed on the interior wall of tube 70.

Spring 85 acts between stop 19 at the end of valve stem 17 and stop 86.

In order to appreciate the operation of the duct motor, it is necessary to identify the different paths through which compressed air can pass when the various valve members are in different positions.

The main distribution valve 7 has two positions, in the first position valve member is located as shown in FIG. 1, in the second position the valve member is displaced to the left so that balls 43 and 44 engage the right hand side groove 105 in the valve member. In the first position an air pass is established from air input 56 to air space 13. The air passage is via filter 58, air chamber 57, annular gap 59 between brass blocks 109 and 110, holes 60 and 108 drilled in block 109, annular cavity 61 to circumferential space 62 the air then passes in a clearance gap between a washer and valve stem 17, through a groove cut in the top of valve stem 46 into the circumferential space 63, through holes 111 into the circumferential space 64. A pair of drilled holes 66 vertical to the plane of the paper connects circumferential passage 64 to cavity 112. Cavity 112 is connected by hollow valve stem 17, and orifices 21 and 15 to air space 13. A second air path is established in this position between air space 12 and air space 113 between valve member 46 and tube 114. Tube 114 is linked directly to atmosphere by a vent hole (not shown). This air path is via the clearance 42, between valve stem 17 and tube 34 to a circumferential passage 115, and holes 116, via groove 130. Valve stem 17 is sealed at the end of the valve by "O" ring 131, so that the clearance passage between valve stem 17 and valve member 46 does not communicate with the clearance passage surrounding the valve stem 17 to the right of the "O" ring 131. An air path also exists via valve stem 17, hollow piston rod 6 the interior of tube 76 air holes 82, past the valve seal of valve 10 ("O" ring 80 and groove 120 in member 78), and orifice 71 to gripper bag 2.

To summarise, when the distribution valve is in the first position three air paths are established:

A. From air space 13 to the source of compressed air.
B. From air space 12 to atmosphere
C. From gripper bag 2 to the source of compressed air (providing the inflation valve is in an open position).

All other air paths are sealed by the various valves. Thus in the first position of distribution valve 10, gripper bag 2 is inflated and the telescopic section 3 is contracting.

When the distribution valve 7 is in its's second position the valve member 46 is displaced to the right, so that holes 111 are no longer linked in an air path connected to the source of compressed air, but now link directly to space 113 and atmosphere. The compressed air supply which is fed into circumferential chamber 62 as described above is now linked via the clearance between valve stem 17 and valve member 46, slot 131 in the head of valve member 46 and holes 116 to air space 12 via the path described above. In this configuration when inflation valve 8 is open, compressed air passes via hole 38 and round the valve seal formed by "O" ring 36 and the wall of the valve member 30, and thence via orifice 88 into bag 1.

To summarise when the distribution valve is in the second position three air paths are established:
A. From air space 12 to the source of compressed air
B. From air space 13 to atmosphere
C. From gripper bag 1 to source of compressed air (providing the inflation valve is open)

Turning now to the operation of the inflation valves 8 and 10, these comprise valve sleeves 30 and 78 respectively, which act as pistons and are located co-axially in tubes Turning now to the operation of the inflation valves 8 and 10 these comprise sleeves 30 and 78 respectively, which act as pistons, having co-axial tubes 34 and 76 located within them. The sleeves 30 and 78 can move axially with respect to the tubes 34 and 76, against the bias of springs 31 and 84 respectively. The sleeves 30 and 78 have grooves 37 and 120 machined in their inner walls, and tubes 34 and 76 have "O" rings 36 and 80, arranged so that a clearance exists between the "O" rings 36 and 80 and the groove bottoms 37, and 120 when the "O" rings are located mid way along the groove. In operation the inflation valve 8 and 10 are normally open. However when compressed air is fed into the appropriate gripper bag, the pressure builds up, and acts on the end faces of the sleeves 30 and 78. When the pressure reaches a predetermined value, the sleeves are forced back against the bias of springs 31 and 84 causing the "O" rings to engage the right hand edge of the grooves e.g. in respect of valve 10 the "O" ring 80 and the edge of groove 134. Thus these valves prevent over inflation of the gripper bags, since they cut off the compressed air supply to the gripper bags when the pressure in the gripper bags exceeds a predetermined value. When the exhaustion valves are actuated the inflation valves are closed, in this situation the inner tubes 30 and 76 move so that the "O" rings 36 and 80 engage the left hand edge of the grooves 37 and 120 i.e. in the case of valve 10 "O" ring 80 engages groove edge 133. This again closes off the inflation valve, and ensures that the compressed air supply is isolated from atmosphere during bag exhaustion. It will be understood that the exhaustion valves are actuated by movement of the gripper bag assembly relative to the respective inner tubes 76 and 30.

The operation of exhaust valves of 9 and 11 will now be considered. These valves are only operated when the telescopic section 3 starts to expand or contract, with both gripper bags inflated. Consider first valve 9, when the telescopic section 3 starts to contract, with both gripper bags inflated, member 39 is pulled to the right so that "O" ring seal 41 no longer engages the interior wall of tube 24, and spring 31 is compressed. Air then escapes from gripper bag 1 past "O" ring seal 41 and into grooves in member 39 which are not shown. The air then passes to atmosphere. As soon as gripper bag 1 is free to move it is pushed to the right by spring 31 closing off the air exhaust path, only permitting partial deflation of bag 1.

Consider valve 11, when both gripper bags are inflated and telescopic section 3 starts to expand, tube 76 is pushed against the end of member 75 displacing it to the right, breaking "O" ring seal 76a and compressing spring 84. This opens an exhaust air path past "O" ring seal 76a, through exhaust ports 73 to atmosphere. As soon as gripper bag 2 is free to move it is pushed to the right by spring 84, resealing the exhaust valve and again only permitting partial deflation of bag 2.

It will be realised that if during movement of a partially deflated gripper bag, the gripper bag fouls the duct wall, the appropriate exhaust valve will open causing further deflation of the gripper bag.

It will also be realised that the inflation valves and deflation valves cooperate, so that the deflation valves cannot open to atmosphere unless the inflation valves have first sealed.

The cyclic operation of the duct motor will now be described in detail. Consider an initial state of the duct motor, with both gripper bags inflated and the telescopic section fully contracted. The distribution valve is in the first position, and the following cycle occurs:

1. Telescopic section 3 will start to extend, compressed air entering space 12 and escaping to atmosphere from space 13.

2. Deflation valve 11 will open partially deflating gripper bag 1.
3. Gripper bag 1 will move to the right until telescopic section 3 is fully extended, compressing spring 18 as the extension occurs.
4. Distribution valve 7 is forced into the second position by the action of spring 18.
5. Telescopic section 3 starts to contract as compressed air is fed into air space 13 and air space 12 is connected to atmosphere. The Gripper bag 2 starts to inflate, and as soon as inflation is completed inflation valve 10 closes under the action of the internal pressure in the gripper bag 2.
6. The initial contraction of telescopic member 3 opens exhaust valve 9, and closes inflation valve 8, causing partial deflation of gripper bag 1 and isolating compressed air from atmosphere.
7. Gripper bag 1 moves to the right, and as telescopic section 3 contracts spring 85 is compressed.
8. At the point of fullest contraction, spring 85 overcomes the ball grips on distribution valve 7 causing the valve to change to the first state.
9. The telescopic section 3 starts to extend as compressed air is fed to air space 12, and air space 13 vents to atmosphere. Inflation valve 8 which is already open passes compressed air to gripper bag 1 starting inflation of this gripper bag. When the gripper bag is inflated inflation valve 8 closes.

The motor now continues with step 2 of the cycle and so on.

Refering to FIG. 1 it can be seen that gripper bags 1 and 2 have flutes formed therein. These are to ensure that air is not trapped in, or excluded from the space between the gripper bags. It will be noted that more flutes are used on the gripper bags of the present invention, this ensures that they are better able to grip the wall of the duct, and are capable of greater inflation. The flutes are necessary to prevent pressure build up or form between the gripper bags when the duct motor is in operation. Such pressure effects would hinder the free operation of the duct motor. It should be noted that the material used for the gripper bags, should, be flexible without being excessively elastic.

It will be seen from FIG. 1 that the distribution valve 7 is to the left of gripper bag 1 i.e. it is not located between gripper bags 1 and 2. This enables the ratio between extended and unextended length of telescopic section 3 to be optimised, and hence the overall length of the duct motor to be reduced. By having a shorter duct motor, it is possible to dispense with any form of flexible link between the two gripper bags, as is used in the prior art invention. This removes a potential cause of weakness in the device.

I claim:

1. Apparatus for self-propulsion along a duct comprising, in combination, first and second inflatable gripping bags and a telescopic fluid pressure operated unit interconnected between said gripping bags, said unit including a piston and cylinder arranged to extend and contract said telescopic unit, an inflation valve and a deflation valve connected to each of said gripping bags, a distribution valve connected to said telescopic unit for controlling the direction of movement of said unit, said distribution valve connected to a source of compressed air, said distribution valve connected to each of said inflation valve of said first and second gripping bags, said first gripping bag extending to grip said duct upon the actuation of said distribution valve and said inflation valve of said first gripper bag contemporaneous with the actuation of the deflation valve of said second gripper bag, said distribution valve connected to said telescopic unit for expanding said unit to move said second gripper bag along said duct, said distribution valve connected to said inflation valve at said second gripper bag for expanding said second gripper bag into engagement with said duct contemporaneous with the actuation of the deflation valve of said first gripper bag, said distribution valve connected to said telescopic member for contracting same and moving said first gripper bag along said duct towards said second gripper bag, said distribution valve having a hollow valve stem associated therewith, said piston having a piston head connected to a hollow piston rod, said hollow valve stem extending through said piston head into said piston rod whereby said compressed air may be fed to said second gripper bag, said distribution valve being located coaxially with and on a side of said first gripper bag remote from said telescopic member.

2. A duct motor as claimed in claim 1 wherein each deflation and each inflation valve are operated by a single return spring.

3. A duct motor as claimed in claim 1 wherein said distribution valve is provided with "O" ring seals.

4. A duct motor as claimed in claim 1 or claim 3 wherein said telescopic member interconnecting said two gripper bags is resistant to bending in a direction transverse to a common axis of said two bags, said bags being located substantially on said common axis.

* * * * *

UNITED STATES PATENT AND TRADEMARK OFFICE
CERTIFICATE OF CORRECTION

PATENT NO. : 4,403,551
DATED : September 13, 1983
INVENTOR(S) : John R. SLIGHT

It is certified that error appears in the above—identified patent and that said Letters Patent is hereby corrected as shown below: On the title page add:

-- [30] Foreign Application Priority Data

August 21, 1979 [GB] United Kingdom ...... 7929025 --.

Signed and Sealed this

Fifteenth Day of November 1983

[SEAL]

Attest:

GERALD J. MOSSINGHOFF

Attesting Officer   Commissioner of Patents and Trademarks